US011785887B2

(12) United States Patent
Bicheier et al.

(10) Patent No.: US 11,785,887 B2
(45) Date of Patent: Oct. 17, 2023

(54) TRIMMER

(71) Applicant: Andreas Stihl AG & Co. KG, Waiblingen (DE)

(72) Inventors: Liv Bicheier, Kernen i. R. (DE); Roland Mandel, Stuttgart (DE); Simon Haug, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 188 days.

(21) Appl. No.: 17/219,990

(22) Filed: Apr. 1, 2021

(65) Prior Publication Data
US 2021/0315158 A1    Oct. 14, 2021

(30) Foreign Application Priority Data
Apr. 9, 2020 (EP) ................... 20169031

(51) Int. Cl.
*A01D 34/90* (2006.01)
(52) U.S. Cl.
CPC ...... *A01D 34/902* (2013.01); *A01D 2034/907* (2013.01)
(58) Field of Classification Search
CPC ...... A01D 34/86; A01D 34/90; A01D 34/902; A01D 2034/907; B25G 1/00–125
USPC .............. D8/1, 8; 16/110–430, 432–446
See application file for complete search history.

(56) References Cited

U.S. PATENT DOCUMENTS

| 4,006,528 | A | | 2/1977 | Katsuya | |
|---|---|---|---|---|---|
| D297,906 | S | * | 10/1988 | Abelsson | ........................... D8/8 |
| D389,706 | S | * | 1/1998 | Haberlein | ......................... D8/8 |
| 5,765,445 | A | * | 6/1998 | Miyata | ..................... G05G 5/04 |
| | | | | | 56/DIG. 18 |
| D413,784 | S | * | 9/1999 | Tsai | ............................... D8/107 |
| 5,979,015 | A | * | 11/1999 | Tamaribuchi | .......... A63C 11/22 |
| | | | | | 16/DIG. 19 |
| 6,021,630 | A | * | 2/2000 | Higashi | .................. A01D 34/90 |
| | | | | | 30/276 |
| 6,176,016 | B1 | | 1/2001 | Higashi et al. | |
| 6,591,507 | B2 | | 7/2003 | Kobayashi et al. | |
| D487,216 | S | * | 3/2004 | Arvidsson | ......................... D8/8 |

(Continued)

FOREIGN PATENT DOCUMENTS

| EP | 2 687 078 | 1/2014 |
|---|---|---|
| EP | 2 845 460 | 3/2015 |

(Continued)

*Primary Examiner* — Adam J Eiseman
*Assistant Examiner* — Richard D Crosby, Jr.
(74) *Attorney, Agent, or Firm* — Gudrun E. Huckett

(57) ABSTRACT

A trimmer has a guide tube and a tool unit connected to an end of the guide tube. A handlebar is secured to the guide tube and has handles connected to a respective end of the bar of the handlebar. Each handle has a shaft with a fastening end and a free end. The fastening end is provided to secure the handle on the power tool. The handles each have a front side facing the tool unit of the guide tube end and an oppositely positioned rear side. The handles each have an inner side and an outer side, wherein the inner sides face each other and wherein the outer sides face away from each other. At least one of the handles is provided with a heel of hand support designed as an elevation extending at the inner side and at the rear side of the shaft.

18 Claims, 8 Drawing Sheets

(56) References Cited

U.S. PATENT DOCUMENTS

| | | | |
|---|---|---|---|
| 6,823,591 B2 * | 11/2004 | Kobayashi | F02B 63/02 30/277.4 |
| 6,880,251 B2 * | 4/2005 | Gambert | A01D 34/902 30/296.1 |
| 7,201,144 B2 | 4/2007 | Yuasa | |
| D600,515 S * | 9/2009 | Tinius | D8/8 |
| 7,584,804 B2 | 9/2009 | Fukuzumi et al. | |
| D625,970 S * | 10/2010 | Tinius | D8/1 |
| 8,127,455 B2 * | 3/2012 | Wenckel | A01D 34/902 30/296.1 |
| 8,151,471 B2 * | 4/2012 | Tomiyama | A01D 34/90 200/321 |
| D690,569 S * | 10/2013 | Tinius | D8/61 |
| D692,287 S * | 10/2013 | Tinius | D8/61 |
| 8,667,648 B2 | 3/2014 | Vierck | |
| 9,049,816 B2 * | 6/2015 | Ito | A01D 34/902 |
| 9,120,528 B2 * | 9/2015 | Badollet | B62K 21/26 |
| 9,782,884 B2 * | 10/2017 | Ota | A01D 34/90 |
| 9,931,746 B2 * | 4/2018 | Rader | B25G 1/102 |
| D825,296 S | 8/2018 | Ahearn | |
| 10,206,329 B2 * | 2/2019 | Alexandersson | A01D 34/006 |
| 10,448,552 B2 * | 10/2019 | Ahearn | A01B 1/022 |
| 10,639,514 B2 * | 5/2020 | Week | A63B 21/06 |
| D907,978 S * | 1/2021 | Schaefer | D8/98 |
| 11,026,367 B2 * | 6/2021 | Honglei | F02N 11/0862 |
| 11,027,408 B2 | 6/2021 | Rizzo | |
| D954,425 S * | 6/2022 | Savioli | D3/12 |
| 2003/0226262 A1 | 12/2003 | Gambert | |
| 2007/0067947 A1 * | 3/2007 | Hittmann | B25F 5/026 15/410 |
| 2009/0223017 A1 * | 9/2009 | Hittmann | B25F 5/026 15/410 |
| 2009/0229131 A1 * | 9/2009 | Tomiyama | A01D 34/90 30/276 |
| 2010/0012338 A1 * | 1/2010 | Okabe | A01D 34/824 30/277.4 |
| 2010/0313430 A1 * | 12/2010 | Yamaoka | A01D 34/828 30/276 |
| 2011/0030227 A1 | 2/2011 | Osawa et al. | |
| 2011/0203118 A1 | 8/2011 | Saito | |
| 2012/0167539 A1 | 7/2012 | Ito et al. | |
| 2012/0168289 A1 | 7/2012 | Ito et al. | |
| 2013/0025136 A1 * | 1/2013 | Whited | B26B 25/002 30/340 |
| 2014/0075693 A1 | 3/2014 | Maslow et al. | |
| 2014/0174772 A1 | 6/2014 | Mandalka et al. | |
| 2017/0297192 A1 * | 10/2017 | Ou | B25G 3/02 |
| 2018/0020817 A1 * | 1/2018 | Wedlock | B25G 3/30 15/145 |
| 2020/0009672 A1 * | 1/2020 | Wu | B23K 3/0338 |

FOREIGN PATENT DOCUMENTS

| | | |
|---|---|---|
| JP | 2013-078268 | 5/2013 |
| WO | 2019/075333 | 4/2019 |
| WO | 2019/206875 | 10/2019 |

* cited by examiner

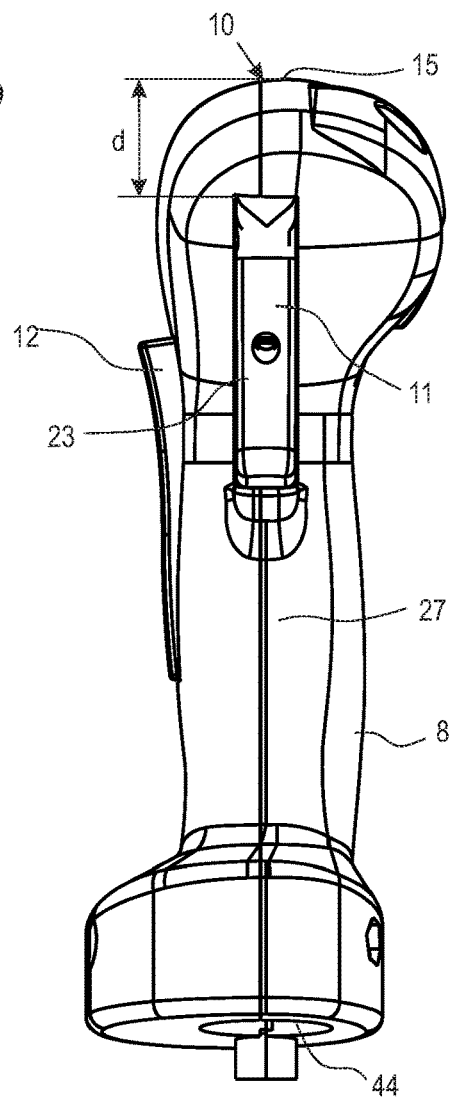
Fig. 9
Fig. 10
Fig. 11
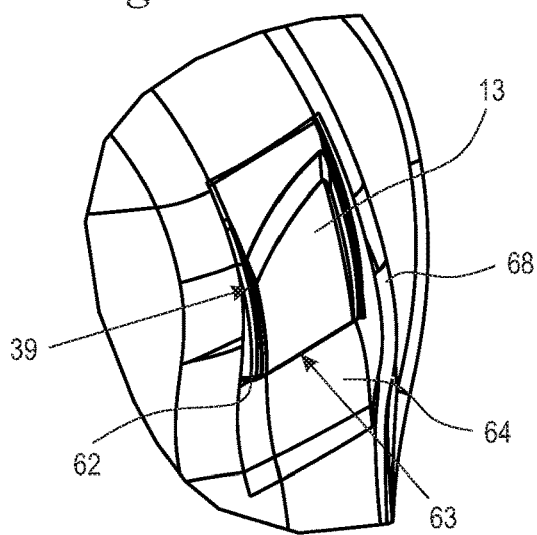
Fig. 12
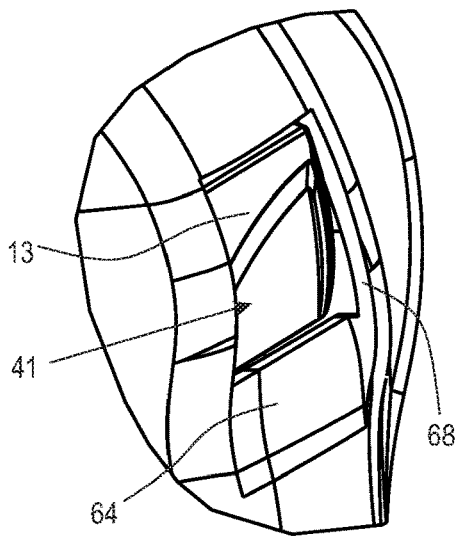
Fig. 13

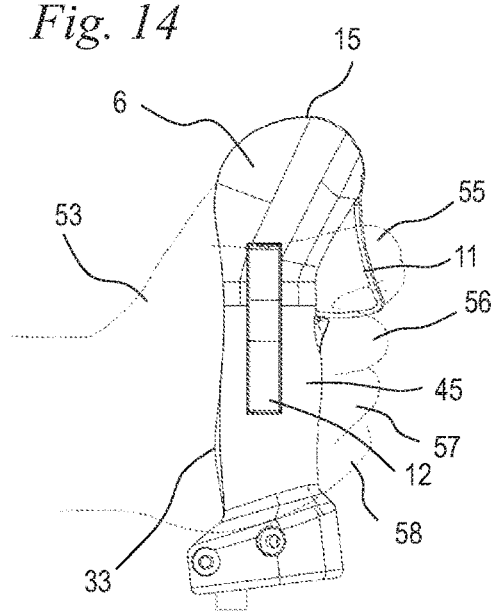
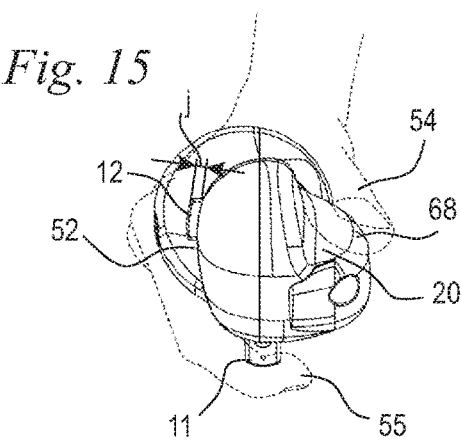
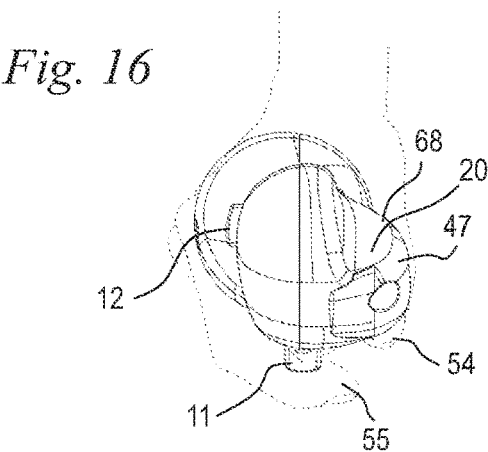
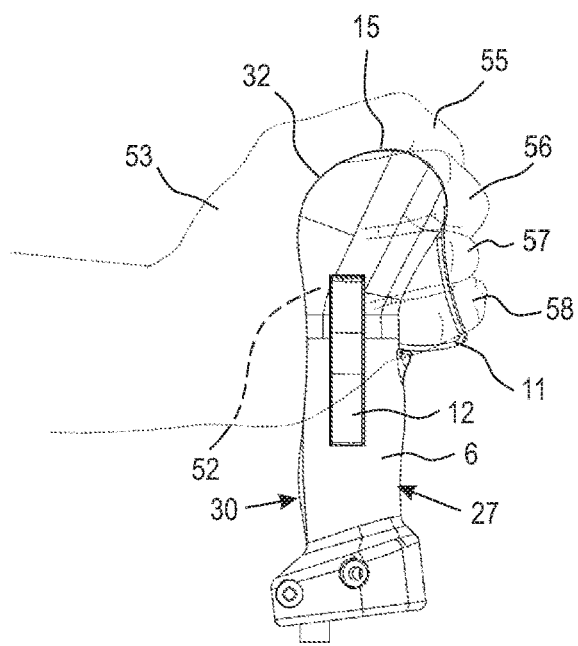
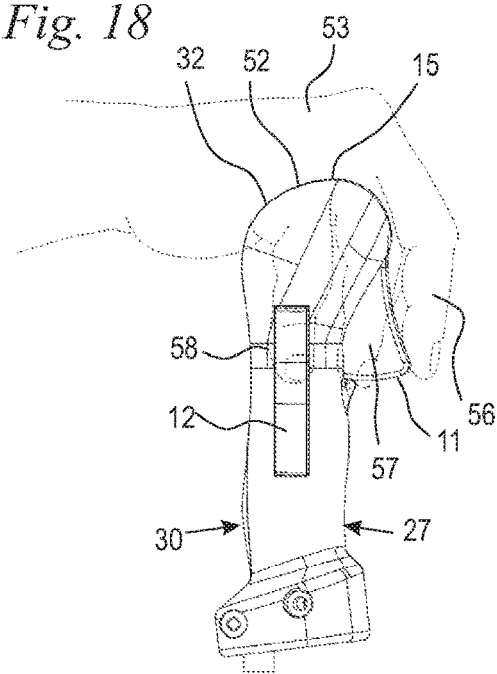

TRIMMER

BACKGROUND OF THE INVENTION

The invention relates to a trimmer.

EP 2 845 460 A1 discloses a trimmer that is provided at its guide tube with a handlebar carrying two handles.

It is an object of the invention to provide a trimmer of the aforementioned kind that enables working in an ergonomic manner without causing fatigue.

SUMMARY OF THE INVENTION

In accordance with the invention, this object is achieved with a trimmer comprising a guide tube wherein at one end of the guide tube a tool unit is arranged, wherein at the guide tube a bar of a handlebar is secured that carries a handle at each end, wherein each handle comprises a shaft that comprises a fastening end at which the handle is connected to the bar of the handlebar and further comprises a free end, wherein each handle comprises a front side positioned so as to face the tool unit and further comprises an oppositely positioned rear side, wherein the handles comprise inner sides positioned to face each other and further comprise outer sides facing away from each other, wherein at least one of the handles comprises a heel of hand support which is embodied as an elevation extending at the inner side and at the rear side of the shaft.

In operation of the trimmer, the operator must apply forces in different directions by means of the handles. In this context, in operation it can be necessary in particular to push or press the tool unit. This is in particular advantageous when the tool unit comprises a blade. In order to be able to introduce forces through the handles in the direction toward the tool unit in forward direction, it is provided that at least one of the handles comprises a heel of hand support that is formed as an elevation extending at the inner side and at the rear side of the shaft. The heel of the hand of the user can be supported by means of the heel of hand support. In this way, the hand can perform a rotating, pushing movement in operation and introduce thereby forces forwardly in the direction toward the tool unit very well and in an ergonomic manner.

In a particularly preferred embodiment, both handles comprise a heel of hand support. In this way, both heels of hand can perform a pushing movement in forward direction and be supported very well at the heel of hand supports of the handles. The lateral force introduction is enhanced by the heel of hand support. The trimmer is advantageously suspended from a carrying strap such that the trimmer is freely suspended from the carrying strap in a work position. The center of gravity of the trimmer in relation to the point of suspension is advantageously moved forward in the direction toward the tool unit. In this way, the trimmer is suspended from the carrying strap such that the tool unit is positioned lower than the housing of the trimmer.

By means of the at least one heel of hand support, in particular forces for mowing can be introduced into the trimmer. During mowing, the trimmer is moved in a back-and-forth movement. The trimmer is pressed and pushed in order to carry out a forward movement. The force introduction in lateral direction is reinforced by the heel of hand support.

By means of the at least one heel of hand support, in particular forces for chopping can be introduced well by means of the trimmer. During chopping, the tool unit is moved up and down. The forces for this movement are introduced by the operator by pulling at the handle in upward direction and by pushing the handle in downward direction. The force for the movement of the tool unit in downward direction is partially, in particular mostly, applied by the weight force of the trimmer.

The at least one heel of hand support enables an improved introduction of these forces. In this way, ergonomic working is made possible.

The heel of hand support comprises advantageously a heel of hand support surface which is positioned between two planes that are positioned at a distance from each other that amounts advantageously to less than 3 mm. The heel of hand support surface is therefore an approximately planar surface. The heel of hand support surface is delimited by the two planes. Sections of the shaft that are not positioned between the two planes are not considered to be part of the heel of hand support surface, even when the heel of hand could be placed onto these sections.

The length of the heel of hand support surface measured in the longitudinal direction of the handle amounts advantageously to at least 2.5 cm, in particular at least 3.5 cm. In this way, forces in circumferential direction can be introduced across a sufficiently large length of the shaft by means of the heel of hand of the user. The width of the heel of hand support surface amounts advantageously to at least 8 mm, in particular at least 1 cm.

The maximum distance of the heel of hand support in relation to the longitudinal direction amounts advantageously to at least 0.7 times, in particular at least 0.8 times, the diameter of the shaft that is measured perpendicularly to the maximum distance and perpendicularly to the longitudinal direction. The rear side, at the heel of hand support surface, comprises at every location a radius of at least 10 mm, in particular at least 15 mm, in a section plane perpendicular to the longitudinal direction. In particular for the second handle, smaller radii in the rim area of the heel of hand support may be also provided however. Preferably, the rear side at the heel of hand support surface is approximately planar. The heel of hand support surface in a section perpendicular to the longitudinal axis of the handle can be convexly and/or concavely curved. Advantageously, the sections of the heel of hand surface that are positioned outwardly in circumferential direction are convexly curved. A flat or concavely curved section can extend in circumferential direction between the convexly curved sections.

Advantageously, the heel of hand support is arranged in the half of the handle which is adjoining the fastening end.

Preferably, the two handles have different shapes. Preferably, operating elements for operating a drive motor of the trimmer are arranged at one of the handles. Preferably, the handle that comprises the at least one operating element is larger than the other handle. Preferably, the right handle is larger than the left handle.

In order to simplify gripping of the handles and in particular also pushing of the trimmer with the heel of the hand, it is advantageously provided that at least one handle in at least one section of the shaft is provided with a rubber coating. Preferably, the rubber coating extends at least partially, in particular completely, across the heel of hand support.

BRIEF DESCRIPTION OF THE DRAWING

Embodiments of the invention will be explained in the following with the aid of the drawing.

FIG. 9 is a side view in the direction of arrow IX-IX in FIG. 3 looking at the front side of the handle.

FIG. 10 is a perspective schematic illustration of the thumb support surface of the handle.

FIG. 11 is a schematic illustration of the actuation path of the third operating element of the handle.

FIG. 12 is a perspective illustration of the third operating element in non-actuated position.

FIG. 13 is a perspective illustration of the third operating element in actuated position.

FIG. 14 is a schematic illustration of a possible hand position at the first handle.

FIG. 15 is a schematic illustration of another possible hand position at the first handle.

FIG. 16 is a schematic illustration of a yet another possible hand position at the first handle.

FIG. 17 is a schematic illustration of another possible hand position at the first handle.

FIG. 18 is a schematic illustration of another possible hand position at the first handle.

DESCRIPTION OF THE PREFERRED EMBODIMENTS

Figure 1:
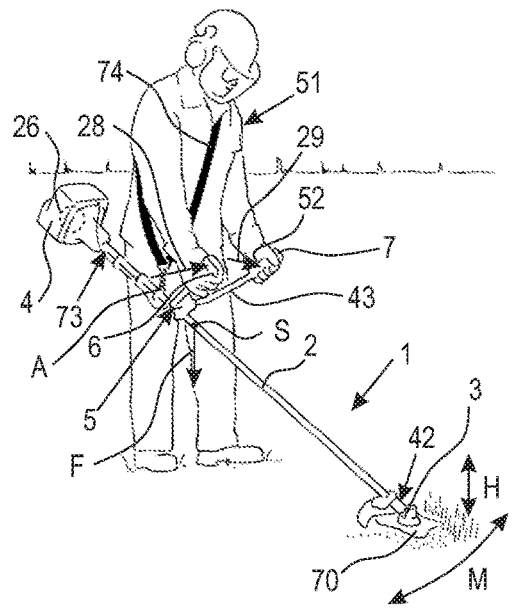
FIG. 1 is a schematic perspective illustration of an operator with a trimmer.

FIG. 1 shows schematically a user 51 who carries a hand-held power tool, i.e., a trimmer 1. The trimmer 1 comprises a guide tube 2. At one end 42 of the guide tube 2, a tool unit 3 is arranged, in the embodiment a tool head with a cutting blade 70. At the other end 73 of the guide tube 2, a housing 4 is arranged. In the embodiment, a schematically illustrated drive motor 26 is arranged in the housing 4. The drive motor 26 can be, for example, an electric motor, in particular an electric motor supplied with energy by a rechargeable battery, or an internal combustion engine.

The operator 51 carries the trimmer 1 by means of a carrying strap 74. By means of the carrying strap 74, the weight of the trimmer 1 in operation is at least partially, in particular mostly, absorbed. The carrying strap 74 holds the trimmer 1 at a suspension point A. The trimmer 1 is advantageously suspended at the carrying strap 74 such that the trimmer 1 is freely suspended from the carrying strap 74 in a work position, i.e., in a position in which the tool unit 3 is arranged lower than the housing 4. In FIG. 1, the center of gravity S of the trimmer 1 and the weight force F are illustrated schematically. In relation to the suspension point A, the center of gravity S of the trimmer 1 is displaced advantageously in the direction toward the tool unit 3. In this way, the trimmer 1 is suspended from the carrying strap 74 such that the tool unit 3 is arranged lower than the housing 4 of the trimmer 1.

For guiding the trimmer 1, a handlebar 5 is secured at the guide tube 2. In particular the forces for moving forward the tool in operation are introduced by means of the handlebar 5. The forward movement can be, for example, a back-and-forth movement when mowing or an up-and-down striking movement in a chopping operation. The movement direction during mowing is schematically illustrated in FIG. 1 by the double arrow M and the movement direction for the chopping operation is indicated by the double arrow H.

The handlebar 5 is a so-called bike handle. The handlebar 5 comprises a bar 43. The bar 43 extends preferably approximately transversely to the guide tube 2. At the ends of the bar 43, a handle 6 and a handle 7 are arranged, respectively. The handles 6, 7 comprise inner sides 29 which are arranged facing each other. The handles 6, 7 comprise outer sides 28 which are facing away from each other. The outer sides 28 of the handles 6 and 7 are in contact with the palm 52 of the hand of the user 51. The inner sides 29 are thus the sides of the handles 6 and 7 which are close to each other and the outer sides 28 are the sides of the handles 6 and 7 which are remote from each other.

FIGS. 2 to 18 show the first handle 6, in the embodiment the right handle. FIGS. 19 to 25 show the second handle 7 which forms the left handle of the trimmer 1 in the embodiment. The handles 6 and 7 can also be used in other hand-guided power tools, in particular in blowers, sprayers and the like.

Figure 2:
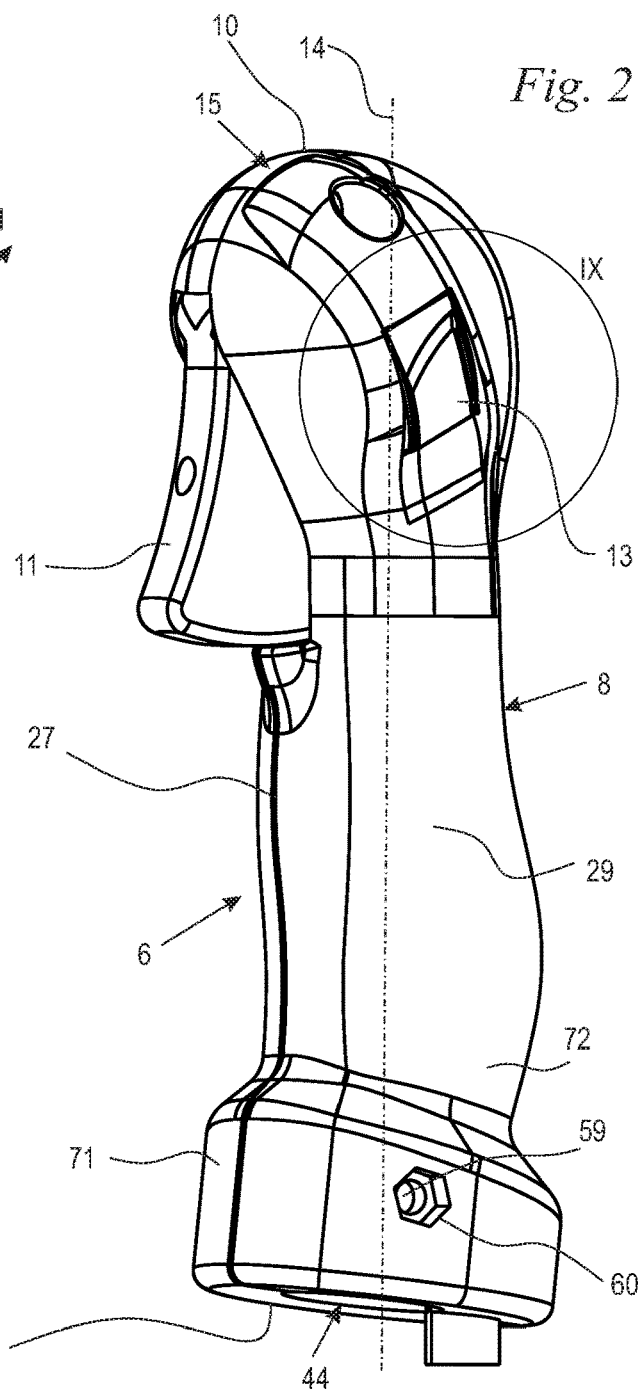
FIG. 2 is a perspective illustration of a first handle of the trimmer of FIG. 1.
Figure 5:
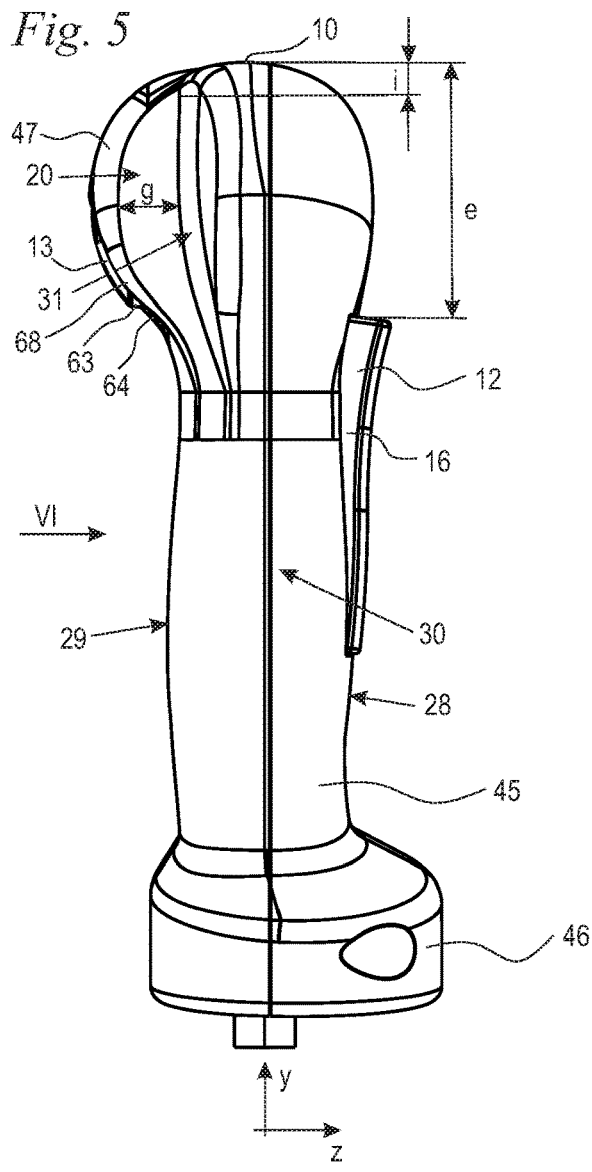
FIG. 5 is a side view in the direction of the arrow V in FIG. 3 looking at the rear side of the handle.

As shown in FIG. 2, the first handle 6 comprises a shaft 8. The shaft 8 comprises a fastening end 9 as well as a free end 10. In the usual working position mounted on a trimmer 2, the free end 10 faces upwardly and forwardly. In the embodiment, at the fastening end 9 a receptacle 44 is formed into which the bar 43 can be inserted. The center axis of the receptacle 44 coincides advantageously with the longitudinal axis 14 of the handle 6. The shaft 8 of the handle 6 in the embodiment is comprised of two half shells 71 and 72 which are resting against each other in a separation plane parallel to the longitudinal axis 14. The first handle 6 comprises a front side 27 which extends between the outer side 28 and the inner side 29. The front side 27 is provided for being in contact with the fingers of a hand of the user 51. In addition, the handle 6 comprises a rear side 30 which is illustrated in FIG. 5 and which is arranged opposite the front side 27. In the usual working position in case of a trimmer, the rear side 30 is facing the operator and the front side 27 is facing in the direction toward the work unit 3.

Figure 3:
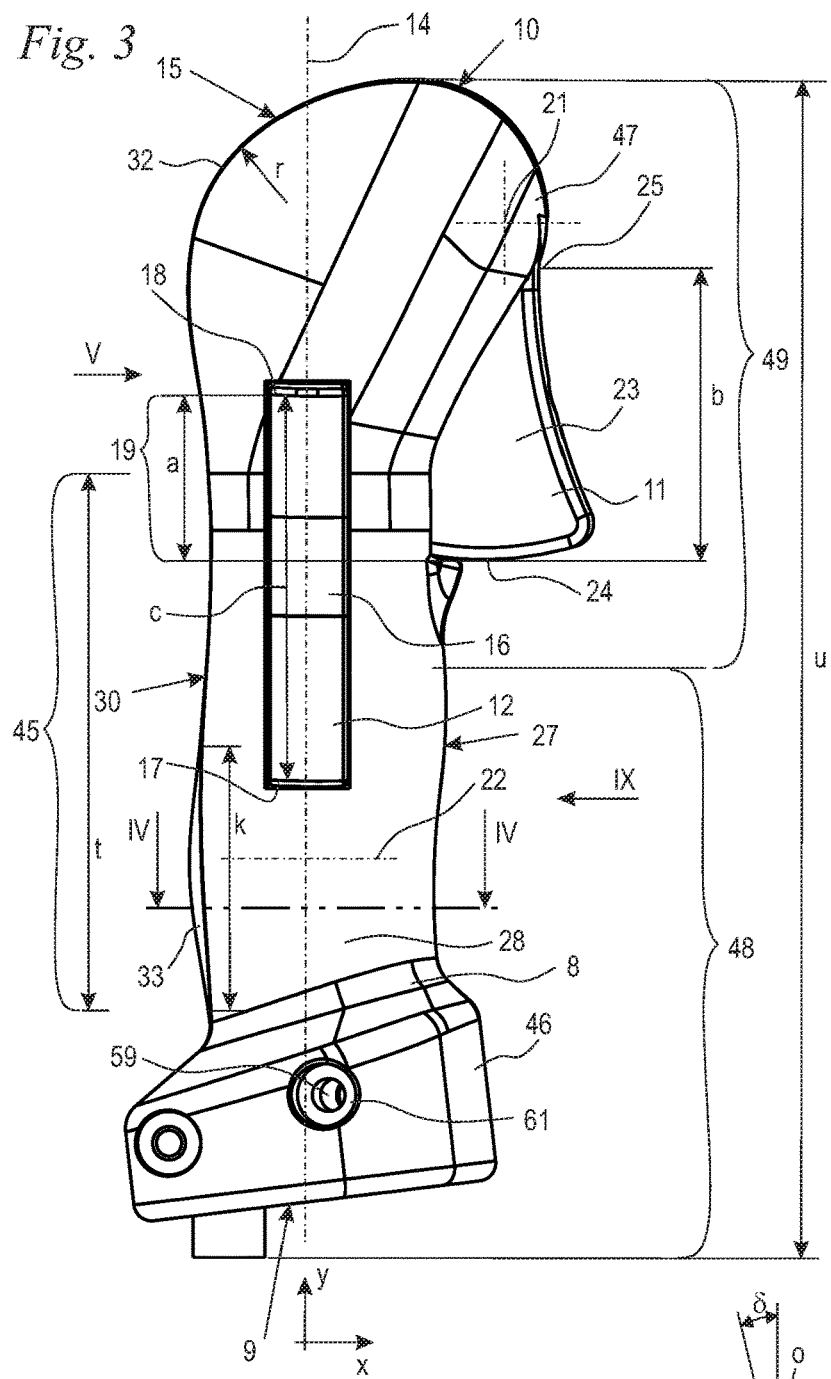
FIG. 3 is a side view of the outer side of the handle of FIG. 2.

For fixation of the handle 6 at the bar 43, advantageously a fastening screw, not illustrated, is provided that projects through a fastening opening 59 provided in the handle 6. The fastening screw penetrates advantageously openings in the bar 43 and secures in this way the position of the handle 6 in relation to the bar 43. In FIG. 2, a receptacle 60 for a fastening nut is illustrated. As illustrated in FIG. 3, the oppositely positioned outer side 28 comprises a receptacle 61 for a fastening screw that is to be screwed into the fastening nut on the opposite side of the handle 6.

As also shown in FIG. 2, at the free end 10 of the handle 6 a support surface 15 for a hand of a user 51 is formed. The support surface 15 is rounded and in regard to its size is matched to the palm of a hand of a user. The first handle 6 comprises also a first operating element 11, as shown in FIG. 2, as well as a second operating element 12 (see FIG. 3) and a third operating element 13 (FIG. 2).

The second operating element 12 that is also arranged at the first handle 6 is illustrated in FIG. 3. The shaft 8 forms an elongate base member of the first handle 6 at which the operating elements 11, 12, and 13 are supported. The first operating element 11 is advantageously configured to control the drive motor 26. By means of the first operating element 11, in particular the rotary speed of the drive motor 26 and thus the rotary speed of the tool can be adjusted. The second operating element 12 can advantageously prevent in a non-actuated position a control action of the drive motor 26 by means of the first operating element 11, for example, by blocking the first operating element 11. The third operating element 13 can be, for example, a stop switch. Other functions of the operating elements 11, 12, and 13 can however be advantageous also.

As shown in FIG. 3, the first operating element 11 projects with an actuating section 23 from the shaft 8 at the front side 27. The actuating section 23 is the entire section of the first operating element 11 that projects from the shaft 8 in the non-actuated position of the first operating element 11. The first operating element 11 is pivotably supported so as to pivot about a first pivot axis 21. The first pivot axis 21 is positioned closer to the free end 10 of the handle 6 than the actuating section 23. The actuating section 23 of the first actuating element 11 comprises a first end 24 and a second end 25. The first end 24 is positioned closer to the fastening end 9 than the second end 25. The pivot axis 21 is positioned closer to the second end 25 of the actuating section 23 than to the first end 24. In the direction of the longitudinal axis 14, the pivot axis 21 is positioned closer to the free end 10 than the second end 25 of the actuating section 23. The actuating section 23 of the first actuating element 11 has a length b that is measured in the direction of the longitudinal axis 14.

The second operating element 12 comprises an actuating section 16 that projects from the shaft 8. The actuating section 16 is the entire section of the second operating element 12 which projects from the shaft 8 in the non-actuated position of the second operating element 12. The actuating section 16 has a length c measured in the direction of the longitudinal axis 14 (FIG. 3). The lengths b and c can be approximately of the same size. The length b is smaller than the length b in the embodiment.

The actuating section 16 of the second operating element 12 comprises a first end 17 and a second end 18. The first end 17 is positioned closer to the fastening end 9 than the second end 18. Both actuating sections 16 and 23 are aligned in the direction of the longitudinal axis 14. The second actuating element 12 is pivotably supported so as to pivot about a pivot axis 22. The pivot axis 22 is positioned closer to the first end 17 than to the second end 18 of the actuating section 16. In the embodiment, the first end 17 comprises a larger distance to the fastening end 9 in the direction of the longitudinal axis 14 than the pivot axis 22. In the embodiment, the pivot axis 22 is positioned between the first end 17 and the fastening end 9 in the direction of the longitudinal axis 14.

The actuating sections 23 and 16 overlap in a length section 19 in non-actuated position of the operating elements 11 and 12. The length section 19 in which both the actuating section 23 and the actuating section 16 are extending has a length a measured in the direction of the longitudinal axis 14. The length a amounts advantageously to at least 30% of the length b of the actuating section 23 of the first operating element 11. Preferably, the length a amounts to at least 50% of the length b.

The shaft 8 of the first handle 6 comprises a grip section 45. The grip section 45 comprises an elongate shape that is cylindrical in coarse approximation. In the direction toward the fastening end 9, a thicker or wider section 46 adjoins the grip section 45. In the direction toward the free end 10, a thicker or wider section 47 adjoins the grip section 45. The length t of the grip section 45 measured in the direction of the longitudinal axis 14 amounts advantageously to a value of one fourth to three fourths of the total length u of the handle 6. In this context, the total length u is measured parallel to the longitudinal axis 14.

The handle 6 comprises a first half 48 which extends from the fastening end 9 across half the length u. The handle 6 comprises in addition a second half 49 which adjoins the first half 48 and extends to the free end 10. The second half 49 extends across half the length u. The grip section 45 is at least partially arranged in the first half 48. In the embodiment, the grip section 45 extends across at least 60% of its length t in the first half 48. The grip section 45 projects also into the second half 49. In the embodiment, the overlap region 19 is arranged completely in the second half 49. It can also be provided that the overlap region 19 extends partially into the first half 48.

The support surface 15 passes across a rounded portion 32 into the rear side 30. The rounded portion 32 is convexly embodied and extends in a rounded shape in the embodiment. The radius r of the rounded portion 32 amounts to at least 1.5 cm, in particular at least 2 cm, at every point thereof in a side view onto the outer side 28 shown in FIG. 3. Particularly advantageous is a radius r of at least 3 cm. The radius r can vary across the course of the rounded portion 32. By means of the rounded portion 32, a uniform transition from the rear side 30 to the support surface 15 is achieved. The hand of the user 51 can glide along easily about the rounded portion 32. Due to the rounded shape of the rounded portion 32, an approximately continuous distance to the oppositely positioned first operating element 11 can be maintained in this context. In this way, it can be ensured that the user 51 can grip the operating element 11 in every intended hand position.

The shaft 8 comprises a heel of hand support 33. The heel of hand support 33 is advantageously arranged at the grip section 45. As shown in FIG. 3, the heel of hand support 33 comprises a length k measured parallel to the longitudinal axis 14. The length k advantageously amounts to at least 2.5 cm, in particular at least 3.5 cm. In the embodiment, the heel of hand support 33 extends into close proximity to the thicker or wider section 46.

Figure 4:
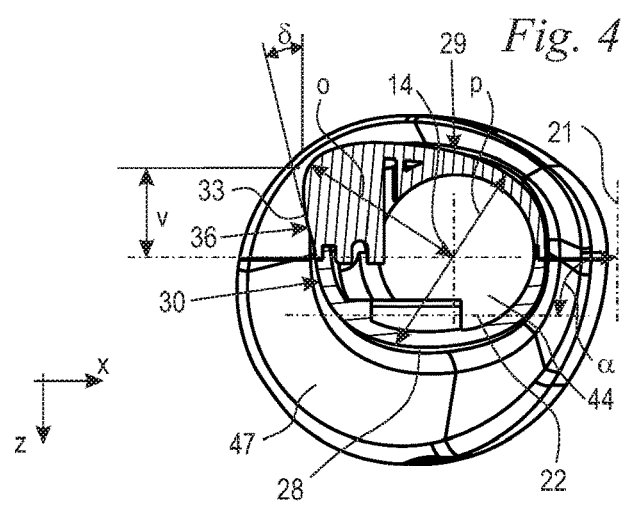
FIG. 4 is a section of the handle in the direction of the line IV-IV in FIG. 3.

FIG. 4 shows a section through the handle 6 in the region of the heel of hand support 33. The section extends perpendicularly to the longitudinal axis 14. The heel of hand support 33 is formed as an outwardly projecting elevation of the otherwise advantageously approximately round cross section of the grip section 45. The heel of hand support 33 extends in the embodiment at the inner side 29 and the rear side 30. The heel of hand support 33 has its largest radial extension approximately in the region in which the inner side 29 and the rear side 30 border each other. The heel of hand support 33 comprises a heel of hand support surface 36 which extends approximately flat. The heel of hand support surface 36 extends advantageously at the rear side 30. The heel of hand support 33 comprises a maximum distance o in relation to the longitudinal axis 14. The section illustrated in FIG. 4 extends in the region in which the heel of hand support 33 comprises the maximum distance o in relation to the longitudinal axis 14. In the same section plane in which the maximum distance o is present, the handle 6 comprises a diameter p which is measured perpendicularly to the maximum distance o. The maximum distance o is advantageously larger than half the diameter p. The maximum distance o amounts advantageously to at least 0.7 times, in particular at least 0.8 times, the diameter p of the shaft 8.

As also shown in FIG. 4, the pivot axes 21 and 22 of the operating elements 11 and 12 are positioned perpendicularly to each other. The pivot axes 21 and 22 are positioned at an angle α to each other that is advantageously smaller than 180°. The angle α amounts to in particular less than 120°, preferably approximately 90°. In the embodiment, the pivot axes 21 and 22 define a coordinate system together with the longitudinal axis 14. The longitudinal axis 14 defines they direction of the coordinate system. They axis is oriented from the fastening end 9 to the free end 10. The pivot axis 21 of the first operating element 11 corresponds to the z axis, and the pivot axis 22 of the second operating element 12 corresponds to the x axis. The x axis is oriented from the rear side 30 toward the front side 27. The z axis is oriented from the inner side 29 toward the outer side 28. The axes x, y, and z form a clockwise rotation system. The heel of hand support 33 extends in negative z direction and negative x direction. The heel of hand support surface 36 is inclined at an angle δ in relation to the z direction wherein the angle advantageously at every point thereof is less than 45°, in particular less than 30°. The heel of hand support surface 36 comprises at a point thereof where the maximum distance o in relation to the longitudinal axis 14 is present a distance v measured in the z direction that corresponds advantageously to at least 0.3 times the diameter p.

Figure 6:
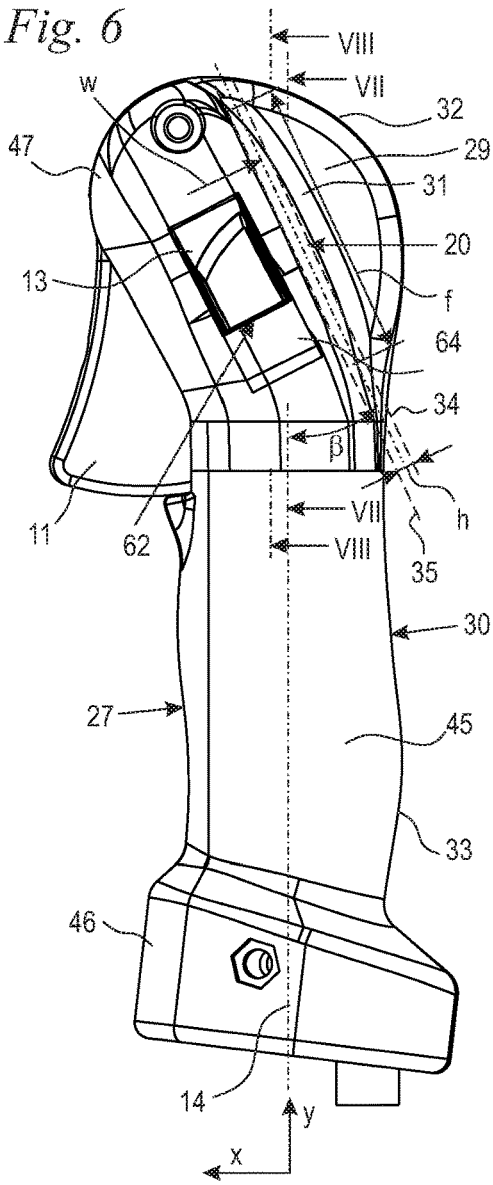
FIG. 6 is a side view in the direction of arrow VI in FIG. 5 looking at the inner side of the handle.

As illustrated in FIGS. 5 and 6, the first handle 6 comprises a thumb support surface 20. The thumb support surface 20 extends at the inner side 29 in the thicker or wider section 47. The thumb support surface 20 has a width g which is measured perpendicularly to the longitudinal axis 14. The thumb support surface 20 comprises a distance i in relation to the first end 10 which is measured in the direction of the longitudinal axis 14. The distance i can be very small for the first handle 6. The thumb support surface 20 can extend to a point close to the free end 10.

As illustrated in FIG. 5, the third operating element 13 is substantially or completely hidden in the illustrated side view in the direction of the x axis toward the rear side 30. The third operating element 13 is positioned in this viewing direction at least partially behind the thumb support surface 20. The third operating element 13 is covered by a cover 68. As illustrated in FIGS. 5 and 6, the third operating element 13 has a side 62 (FIG. 6) which is facing the fastening end 9. In the embodiment, the third operating element 13 is aligned approximately parallel to the thumb support surface 20. The side 62 extends at a slant to the longitudinal axis 14. Near the side 62, a recess 64 is formed at the handle 6; the recess 64 facilitates actuation of the third operating element 13 at the side 62. In respect to the recess 64, the third operating element 13 comprises a projecting portion 63 at the side 62. The projecting portion 63 has a length that amounts to advantageously at least 1 mm, in particular at least 2 mm. In this way, even with gloves a safe actuation of the operating element 13 at the side 62 is possible. As also illustrated in FIG. 5, the second operating element 12 comprises a distance e in relation to the free end 10 that is measured parallel to the longitudinal axis 14.

Figure 7:
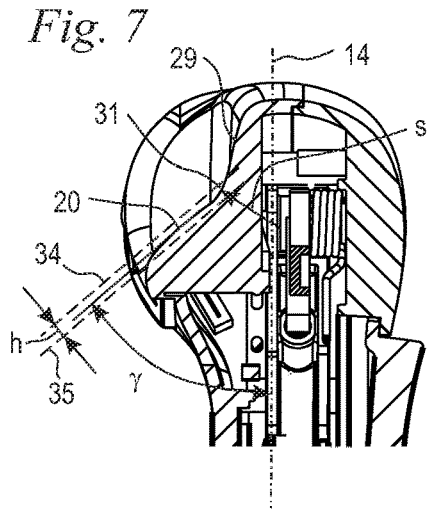
FIG. 7 is a detail section illustration along the line VII-VII in FIG. 6.
Figure 8:
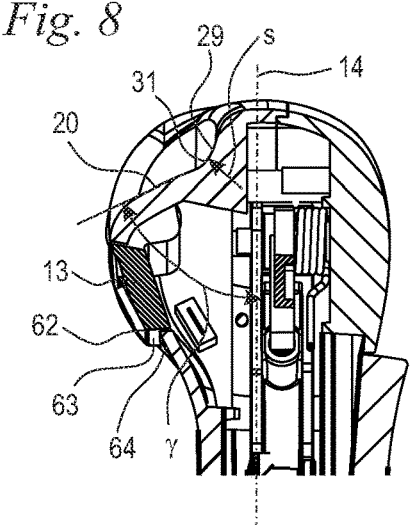
FIG. 8 is a detail section illustration along the line VIII-VIII in FIG. 6.

In FIGS. 6 to 8, the orientation of the thumb support surface 20 is illustrated. As shown in FIG. 6, the thumb support surface 20 is slanted at an angle β in relation to the longitudinal axis 14 in a viewing direction toward the inner side 29, i.e., in a viewing direction in the direction of the z axis. The angle β amounts to at least 20° and at most 70° at every point of the thumb support surface 20. In this way, on the one hand, an ergonomic hand position is achieved. On the other hand, due to the orientation of the thumb support surface 20, a very good introduction of forces to the tool unit 3 (FIG. 1) is possible so that beneficial force conditions are provided in particular for pushing and pressing the tool.

In the side view illustrated in FIG. 6, the thumb support surface 20 is preferably convexly curved. A configuration that is planar or concavely curved can however be advantageous also. The thumb support surface 20 is positioned between two parallel planes 34 and 35. The planes 34 and 35 extend advantageously at a slant in relation to the plane of the drawing sheet. The planes 34 and 35 do not extend parallel to any of the axes x, y, z of the coordinate system of the handle 6. The planes 34 and 35 are illustrated therefore schematically in FIG. 6. The thumb support surface 20 is in this context advantageously embodied such that the distance h of the two planes 34 and 35 amounts to less than 3 mm, in particular less than 2 mm. The width g of the thumb support surface 20 amounts advantageously to at least 8 mm. The length f of the thumb support surface 20, which is illustrated in FIG. 6, amounts advantageously to at least 2.5 cm. Preferably, a length f of at least 3 cm, in particular of at least 4 cm, is provided. The length f and the width g are measured in this context in a region that is positioned between the planes 34 and 35. Surface sections that border the thumb support surface 20 and are positioned outside of the planes 34 and 35 are not considered part of the thumb support surface 20 in this context. The thumb support surface 20 comprises advantageously a curvature whose radius w at every point thereof amounts to at least 10 mm, preferably at least 15 mm, advantageously at least 30 mm. In the embodiment, the radius of the curvature at every point thereof amounts to at least 40 mm. Also, a flat configuration of the thumb support surface 20, i.e., an infinite radius, can be advantageous. The thumb support surface 20 passes with a curved portion 31 into the inner side 29 of the handle 6. The curved portion 31 is concavely shaped.

As illustrated in FIGS. 7 and 8, the thumb support surface 20 descends in a direction from the longitudinal axis 14 to the exterior. A slight ascend of the thumb support surface 20 in this direction can however be advantageous also. In a section plane which extends parallel to the longitudinal axis 14 and through the inner side 29, i.e., a section plane in the y-z plane, the thumb support surface 20 is positioned in relation to the longitudinal axis 14 at an angle γ which opens toward the fastening end 9. The angle γ advantageously amounts to 30° to 110°. Particularly preferred, the angle γ amounts to 45° to 90°. The angle γ is preferably smaller than 90°. In FIG. 8, also the projecting portion 63 of the third operating element 13 past the recess 64 can be seen well. FIGS. 7 and 8 show also the configuration of the concave curved portion 31. The curved portion 31 comprises a radius s which can be embodied to be comparatively small, namely smaller than 2 cm, in particular smaller than 1 cm. The radius s must not be continuously of the same size but can also vary, as illustrated in FIGS. 7 and 8.

As illustrated in FIG. 9, the actuating section 23 of the first operating element 11 comprises a distance d in relation to the free end 10. The actuating section 16 of the second operating element 12 comprises a distance e in relation to the free end 10 that is illustrated in FIG. 5. The distance e in the embodiment is greater than the distance d. The distances d and e amount advantageously to less than 7 cm. In this way, the operating elements 11 and 12 can be actuated by a user 51 even when the hand of the user 51 is resting on the support surface 15.

In FIG. 10, the configuration of the thumb support surface 20, the curved portion 31, and the inner side 29 bordering it are illustrated.

The third operating element 13 is arranged such that an accidental actuation of the third operating element 13 is avoided even when the operator places his hand onto the support surface 15 at the free end 10 of the shaft 8. As illustrated schematically in FIG. 11, the third operating element 13 can actuate, for example, a schematically illustrated switch 65. An actuation of a mechanical element can also be provided. The operating element 13 comprises a non-actuated position 39 illustrated schematically in FIG. 11 as well as an actuated position 41 in which the switch 65 is completely actuated. Between these positions 39 and 41, the operating element 13 can travel first across an idle stroke 66. While performing this idle stroke 66, the switch 65 is not actuated. An actuating stroke 67 follows the idle stroke 66; the switch 65 is pushed when the actuating stroke 67 is carried out. The position of the third operating element 13 in which the operating element 13 has moved across the idle stroke 66 and begins to carry out the actuating stroke 67 is presently referred to as actuating position 40 (FIG. 11). In order to prevent accidental actuation of the switch 65, the actuating position 40 is determinative at which the actuating stroke 67 begins. An actuation of the third operating element 13 within the idle stroke 66 is without effect on the function of the trimmer 1.

FIG. 12 shows the third operating element 13 in non-actuated position 39. The third operating element 13 in the embodiment is covered by the cover 68 in the direction toward the thumb support surface 20 and toward the free end 10. The cover 68 in this context is at least so large that the third operating element 13, in the viewing direction in the direction of the longitudinal axis 14 toward the fastening end 9, projects in the actuating position 40 by at most 1 mm past the outer contour of the handle 6, 7, i.e., past the cover 68.

FIG. 13 shows the third operating element 13 in actuated position 41. The operating element 13 in the embodiment is pushed in deeper into the shaft 8 than the recess 64 so that the recess 64 projects past the operating element 13 at the side 62. However, it can also be provided that the third operating element 13 ends flush with the bottom of the recess 64 or projects past it. An adjustment of the third operating element 13 from the non-actuated position 39 illustrated in FIG. 12 into the actuated position 41 illustrated in FIG. 13 is advantageously only possible, due to the cover 68, when the operator pushes actively on the operating element 13. An accidental actuation is avoided due to the cover 68.

FIGS. 14 to 18 show different possible grip positions for the handle 6. FIG. 14 shows the handle 6 schematically together with the hand 53 of the user 51 (FIG. 1). The hand 53 of the user 51 encloses the grip section 45. The heel of the hand is positioned on the heel of hand support 33. The palm 52 of the hand (FIG. 15) is resting on the second operating element 12 and actuates it. The index finger 55 is positioned at the first operating element 11 and can actuate the latter. The middle finger 56, the ring finger 57, and the little finger 58 encloses the grip section 45. For this hand position, two possible positions for the thumb 54 are provided. FIG. 15 shows an arrangement in which the thumb 54 is placed on the thumb support surface 20 and is supported thereon. In the position illustrated in FIG. 16, the thumb 54 is positioned below the thicker or wider section 47. The thumb 54 can surround the grip section 45 in this position. As illustrated in FIG. 15, the thumb 54 can however also actuate the third operating element 13. In this case, the thumb 54 is located below the thicker cover 68 (FIGS. 12 and 13).

As illustrated in FIGS. 15 and 16 showing views in the direction of the longitudinal axis 14 toward the fastening end 9, the third operating element 13 in this viewing direction is completely hidden by the cover 68. The third operating element 13 cannot be seen in this view. The thumb support surface 20 is advantageously comparatively large. In the viewing direction in the direction of the longitudinal axis 14 toward the fastening end 9, the surface area of the thumb support surface 20 amounts to advantageously at least 10%, in particular at least 20%, preferably at least 25%, of the entire visible surface of the thicker section 47 of the first handle 6. Advantageously, the surface area of the thumb support surface 20 in the viewing direction in the direction of the longitudinal axis 14 toward the fastening end 9 amounts to less than 70%, in particular less than 50%, in particular less than 30%, of the entire visible surface of the thicker or wider section 47 of the first handle 6.

In FIG. 15, the second operating element 12 is illustrated in actuated position. In this position, the second operating element 12 advantageously projects only slightly or not at all past the outer contour of the shaft 8. In the embodiment, it is provided that the second operating element 12 in actuated position projects by a projecting length j past the outer contour of the shaft 8; the projecting length j amounts to at most 3 mm, in particular at most 2 mm. The projecting length j advantageously amounts to not more than 3 mm, in particular not more than 2 mm. at every point of the second operating element 12

FIG. 17 shows a hand position in which the hand 53 is partially supported at the support surface 15, namely advantageously with the inner side of the index finger 55. The middle finger 56 encloses the thicker or wider section 47. The ring finger 57 and the little finger 58 are positioned at the first operating element 11 and can actuate the latter. The palm 52 of the hand of the user 51 is arranged at the second operating element 12 and can actuate the second operating element 12.

In FIG. 18, a hand position is illustrated in which the palm 52 of the hand 53 is resting on the support surface 15. The second operating element 12 can be gripped with the little finger 58. The middle finger 56 is provided for actuation of the first operating element 11. Also, an actuation by means of the index finger 55 or the ring finger 57 may be preferred by the operator 51. Due to the distances d and e of the operating elements 11 and 12 of less than 7 cm in relation to the free end 10 (FIGS. 5 and 9), an actuation of the operating elements 11 and 12 is also possible without problem for the hand position illustrated in FIG. 18.

Due to the continuous rounded portion 32, the user 51 can change between the different hand positions in that the hand 53 is moved along the rounded portion 32. In this way, ergonomic working even over extended periods of time is possible.

FIGS. 19 to 25 show the configuration of the second handle 7. The second handle 7 is advantageously a left handle. The second handle 7 comprises no operating elements in the embodiment. In this way, the second handle 7 can be designed as a whole smaller than the first handle 6. The two handles 6 and 7 are shaped differently. However, the second handle 7, like the first handle 6, comprises a thumb support surface 20, a support surface 15 at the free end 10, and a heel of hand support surface 33. Same reference characters identify same or corresponding elements for the two handles.

Figure 20:
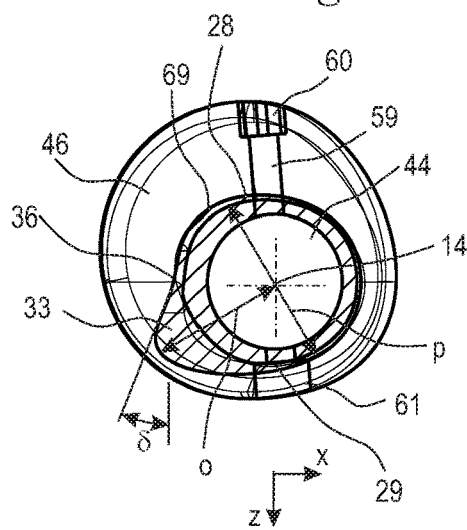
FIG. 20 is a section of a heel of hand support of the second handle along the line XX-XX in FIG. 19.

The second handle 7 also comprises a shaft 8 that comprises a fastening end 9 as well as a free end 10. A receptacle 44, not illustrated here, for the bar 43 is provided at the fastening end 9. Also, the second handle 7 comprises a longitudinal axis 14 which advantageously coincides with a y axis. The y axis is oriented from the fastening end 9 to the free end 10. An x axis extends from the rear side 32 to the front side 27. The z axis, as illustrated in FIG. 20, extends from the outer side 28 to the inner side 29. The axes x, y, z form a clockwise rotation system.

Figure 19:
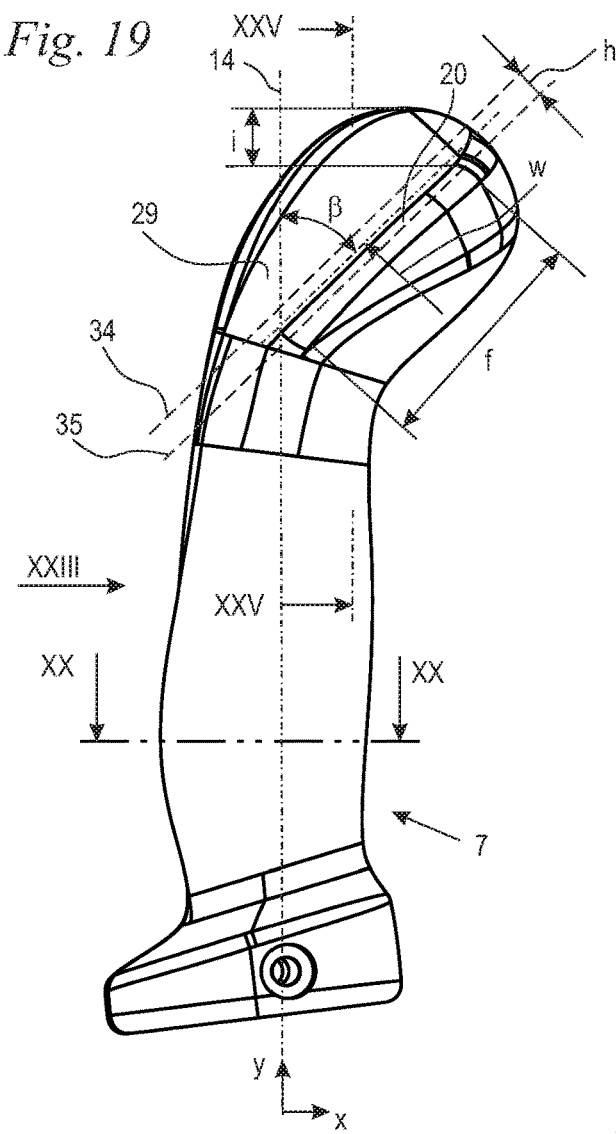
FIG. 19 is a side view of the second handle.

As illustrated in FIG. 19, the thumb support surface 20 is positioned in relation to the longitudinal axis 14 at an angle β. The angle β amounts to at least 20° and at most 70° for the second handle 7 also. In the embodiment, the angle β for the second handle 7 is slightly greater than the angle β for the first handle 6. Since no third operating element 13 must be provided at the second handle 7 adjacent to the thumb support surface 20, the orientation of the thumb support surface 20 can be selected more freely. The thumb support surface 20 of the second handle 7 is positioned between the planes 34 and 35 which advantageously comprise a distance h of less than 3 mm, in particular of less than 2 mm, in relation to each other. The thumb support surface 20 in the embodiment is slightly concavely curved. Convex sections adjoin the concave section. The curved portion of the thumb support surface 20 comprises at every point thereof a radius w that amounts to at least 10 mm, in particular at least 15 mm. The smallest radius w of the second handle 7 is in particular smaller than the smallest radius w of the first handle 6. Also, a flat configuration of the thumb support surface 20 can be advantageous. The thumb support surface 20 comprises a distance e in relation to the free end 10. The distance e amounts to at least 1 cm for the second handle 7 in the embodiment. The thumb support surface 20 comprises a length f that amounts to at least 2.5 cm, in particular at least 3 cm. The thumb support surface 20 comprises a width g that amounts to advantageously at least 8 mm, in particular at least 1 cm.

In FIG. 20, the configuration of the heel of hand support 33 is illustrated in detail. The heel of hand support 33 forms a heel of hand support surface 36 which extends at the rear side 29 of the second handle 7. The heel of hand support surface 36 is approximately flat and can be slightly concavely curved in a section plane parallel to the longitudinal axis 14. Also a convexly curved portion is possible. The maximum distance o and its ratio to the diameter p correspond to that of the first handle 6. As illustrated in FIG. 20, the heel of hand support surface 36 is slanted by an angle δ in relation to the z-y plane in the illustrated section plane perpendicular to the y axis. The angle δ of the heel of hand support surface 36 of the second handle 7 can be larger than the angle δ for the first handle 6. Same angles δ can also be provided.

Figure 21:
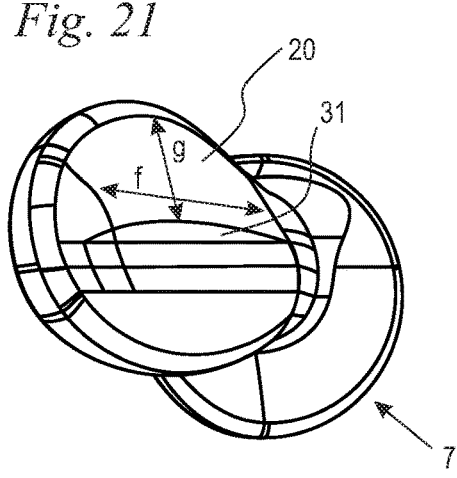
FIG. 21 is a perspective illustration of the second handle.
Figure 22:
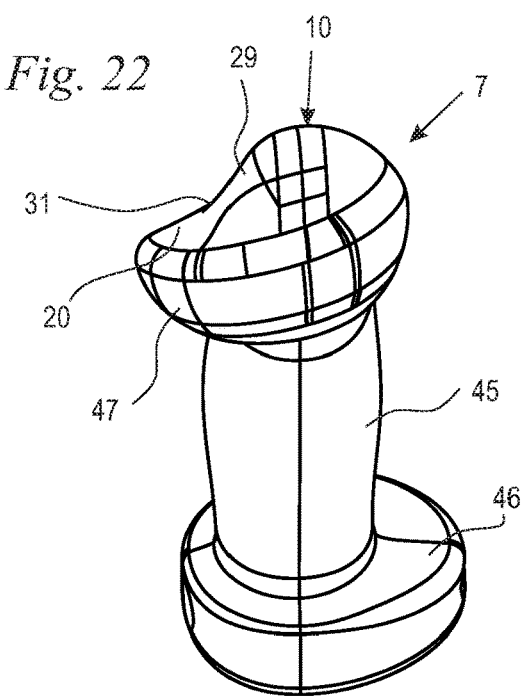
FIG. 22 is another perspective illustration of the second handle.
Figure 23:
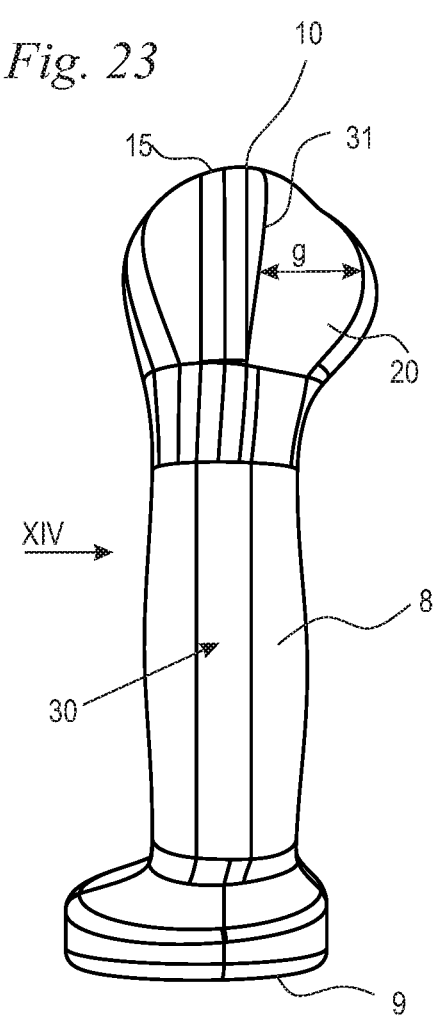
FIG. 23 is a side view of the rear side of the second handle viewed in the direction of arrow XXIII in FIG. 19.
Figure 25:
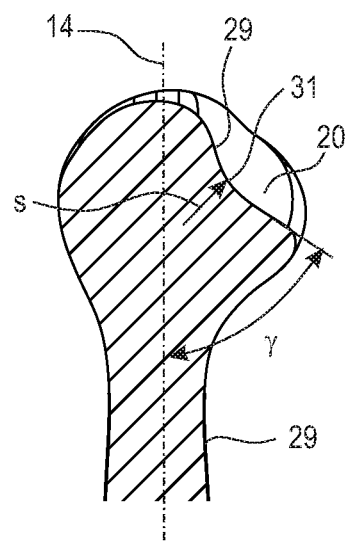
FIG. 25 is a detail section illustration of the thumb support surface along the line XXV-XXV in FIG. 19.

In FIG. 21, the width g and the length f of the thumb support surface 20 can be seen well. In FIG. 22, it is shown that the curved portion 31 with which the support surface 20 passes into the inner side 29 is significantly larger than at the first handle 6. This can also be seen in FIG. 23 and FIG. 25. As shown in FIG. 25, the radius s of the curved portion 31 is advantageously larger than 2 mm, in particular larger than 5 mm. In a section plane parallel to the longitudinal axis 14, the thumb support surface 20 is positioned in relation to the longitudinal axis 14 at an angle γ which corresponds to the angle γ which has been described in connection with the first handle 6.

Figure 24:
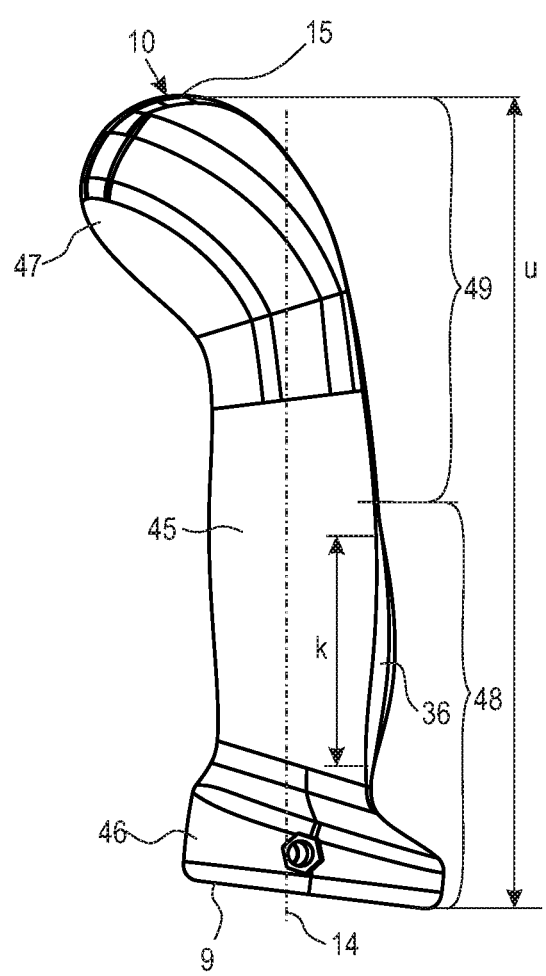
FIG. 24 is a side view in the direction of arrow XXIV in FIG. 23 looking at the outer side of the handle.

As illustrated in FIG. 24, the heel of hand support surface 36 is arranged in the first half 48 of the grip section 45. As also shown in FIG. 24, the heel of hand support surface 36 has a length k measured in the direction of the longitudinal axis 14. The length k amounts advantageously to at least 2.5 cm, in particular at least 3.5 cm. The second handle 7 comprises a length u indicated in FIG. 24. The length u of the second handle 7 is advantageously smaller than the length u of the first handle 6.

Figure 26:
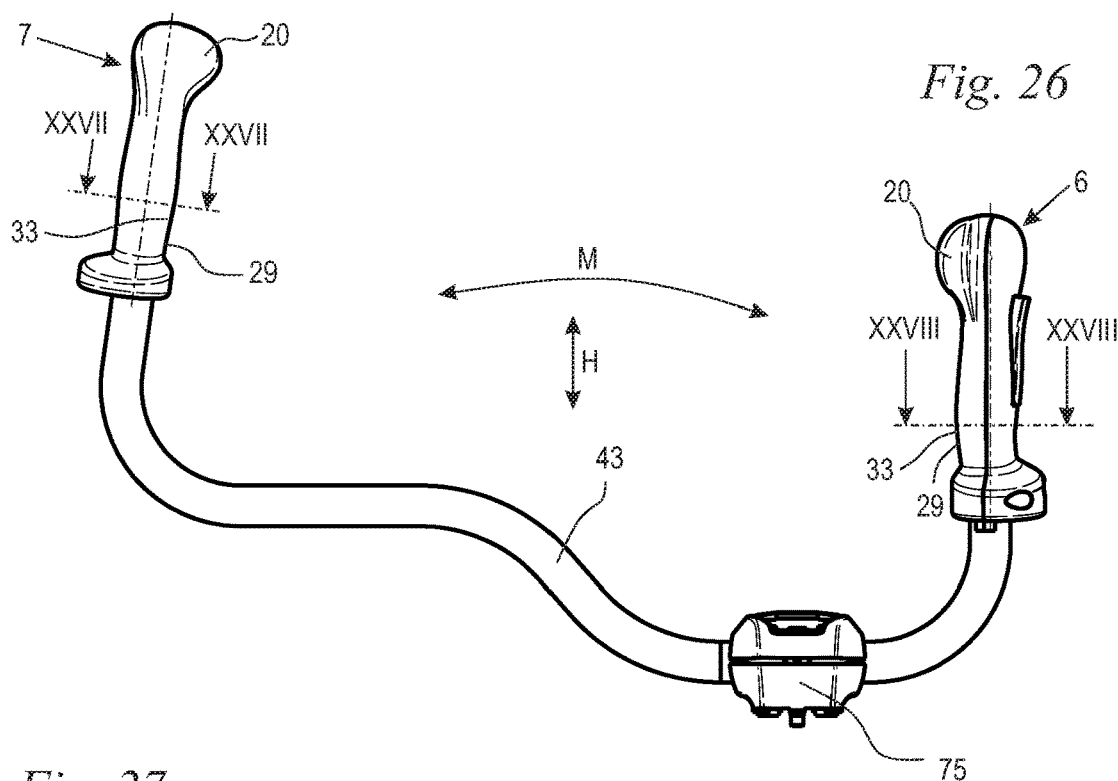
FIG. 26 is a side view of a handlebar of a trimmer with two handles.

In FIG. 26, the configuration of the handlebar 5 is illustrated. At the bar 43, a fastening device 75 is illustrated by means of which the bar 43 can be secured at the guide tube 2. The fastening device 75 enables advantageously an adaptation of the position of the bar 43 in length direction of the guide tube 2 and/or pivoting of the bar 43 about the fastening device 75 in order to make the slant of the bar 43 and the slant of the handles 6 and 7 adjustable. In FIG. 26, also the thumb support surfaces 20 of the two handles 6 and 7 are illustrated. In FIG. 26, the movement directions M for a mowing operation and H for the chopping operation are indicated.

Figure 27:
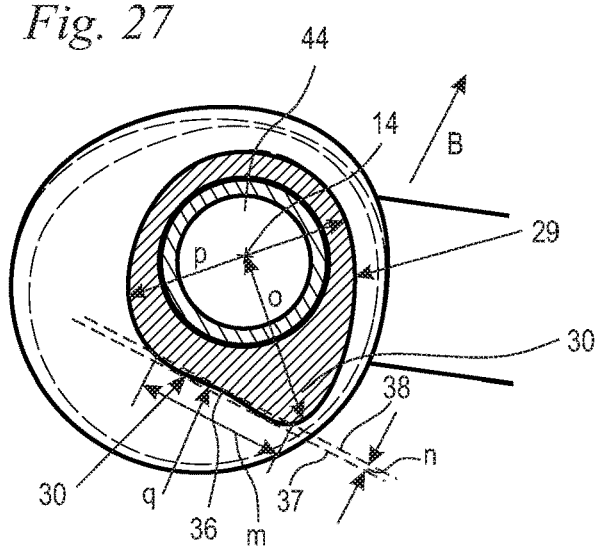
FIG. 27 is a section along the line XXVII-XXVII in FIG. 26 through the second left handle.
Figure 28:
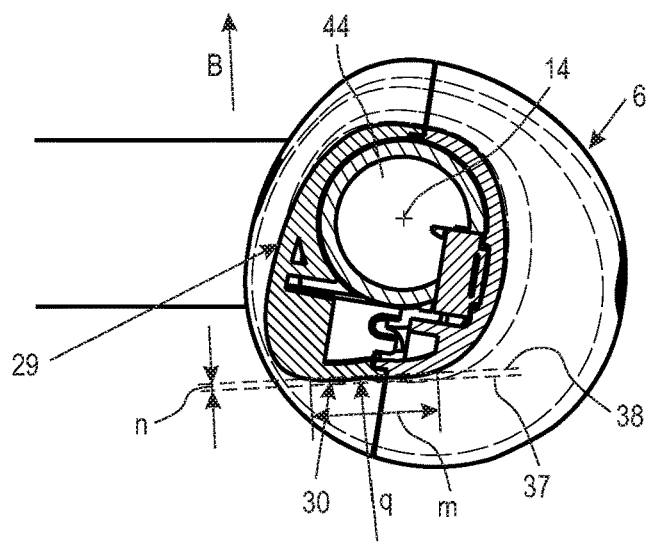
FIG. 28 is a section along the line XXVIII-XXVIII in FIG. 26 through the first right handle.

FIGS. 27 and 28 show each a section through the heel of hand support 33 in the region in which the heel of hand support 33 has the maximum distance o in relation to the longitudinal axis 14.

FIG. 27 shows that the heel of hand support surface 36 of the second handle 7 comprises a width m. The width m amounts advantageously to at least 8 mm, in particular at least 1 cm. Across the width m and the length k, the hand of heel support surface 36 is positioned between two planes 37 and 38 that extend parallel to each other. The two planes 37 and 38 comprise a distance n in relation to each other that is advantageously less than 3 mm. The length k and the width m are measured in the region of the heel of hand support surface 36 which is positioned between the planes 37 and 38.

As illustrated in FIG. 28, the heel of hand support surface 36 of the first handle 6 comprises a width m that amounts advantageously to at least 8 mm, in particular at least 1 cm. The heel of hand support surface 36 is positioned between two parallel planes 37 and 38 whose distance n from each other amounts to at most 3 mm. The length k (FIG. 3) and the width m are measured in the region of the heel of hand support surface 36 that is located between the planes 37 and 38.

As also shown in FIGS. 27 and 28, the heel of hand support surfaces 36, in particular the heel of hand support surface 36 of the first handle 6, comprises a radius q in the illustrated section plane perpendicular to the longitudinal axis 14; the radius q amounts to at least 10 mm, in particular at least 15 mm, at every point thereof. The heel of hand support surface 36 can extend in a concave and/or convex shape in the illustrated section plane. An extension that is flat at least in sections or a continuous flat extension can be advantageous also. Smaller radii can be provided also in particular for the heel of hand support surface 36 of the second handle 7. The radius q of the middle concave region amounts advantageously to at least 10 mm, in particular at least 15 mm. The convex regions adjoining in circumferential direction can have radii that are smaller than 10 mm.

Due to the orientation of the heel of hand support surface 36, a good force introduction in a force direction B is possible by means of the heel of hand support surface 36. The force directions B of the two handles 6 and 7 can extend inclined in relation to each other, as shown in FIGS. 27 and 28. The force direction B extends advantageously transversely to the heel of hand support surface 36. The force direction B extends in particular perpendicularly to the planes 37 and 38. The heel of hand support surface 36 is advantageously oriented transversely to, in particular perpendicularly to, the direction toward the tool unit 3. In this way, forces in the direction toward the tool unit 3 can be introduced well by means of the heel of hand support surface 36.

By pushing on the heel of hand support surface 36 of one of the handles 6, 7 and holding or pulling at the other one of the handles 6, 7, a force can be introduced simply and ergonomically in the movement direction M for a mowing operation. By pushing on the heel of hand support surface 36, in particular pressing on the heel of hand support surfaces 36 of both handles 6, 7, the tool unit 3 can be pushed down and a force can be introduced well and ergonomically in this way in the movement direction H for the chopping operation.

The heel of hand support 33 is embodied as an elevation that extends at the inner side 29 and the rear side 30 of the shaft 8. The heel of hand support 33 is arranged for both handles 6, 7 at least partially, in particular completely, in the first half 48 of the respective handle 6, 7. As illustrated in FIG. 20 for the second handle 7, the handle 7 has a rubber coating 69. Advantageously, each handle 6, 7 comprises a rubber coating in at least one section, in particular across the entire outer surface of the shaft 8. In this way, improved grip of the hand 52 of the user 51 at the handle 6, 7 is achieved.

Further features of the second handle 7 correspond to the features of the first handle 6, and reference is being had to the description of handle 6 in this respect.

A handle with a heel of hand support can also be advantageous for other power tools, in particular blowers. A handle with a heel of hand support is in particular advantageous for power tools with a handlebar. A handle with a heel of hand support is in particular advantageous for backpack-type blowers.

The specification incorporates by reference the entire disclosure of European priority document 20 169 031.0 having a filing date of Apr. 9, 2020.

While specific embodiments of the invention have been shown and described in detail to illustrate the inventive principles, it will be understood that the invention may be embodied otherwise without departing from such principles.

What is claimed is:

1. A trimmer comprising:
   a guide tube;
   a tool unit connected to a tool unit end of the guide tube;
   a handlebar comprising a bar secured to the guide tube and further comprising handles, wherein each handle is arranged at a respective end of the bar;
   wherein the handles each comprise a shaft comprising a fastening end and a free end, the fastening end configured to secure the handle to the end of the bar;
   wherein the handles each comprise a front side facing the tool unit end of the guide tube and an oppositely positioned rear side;
   wherein the handles each comprise an inner side and an outer side, wherein the inner sides face each other and wherein the outer sides face away from each other;
   wherein at least one of the handles comprises a heel of hand support configured as an elevation extending at the inner side and at the rear side of the shaft;
   wherein the heel of hand support comprises a heel of hand support surface;
   wherein the heel of hand support surface is configured to extend between two parallel planes, wherein the two parallel planes are arranged at a distance of less than 3 mm from each other;
   wherein a length of the heel of hand support surface measured in a direction of a longitudinal axis of the at least one handle amounts to at least 2.5 cm and wherein a width of the heel of hand support surface amounts to at least 8 mm.

2. The trimmer according to claim 1, wherein the rear side at the heel of hand support surface of the heel of hand support in a section plane perpendicular to the longitudinal axis of the at least one handle comprises a radius of at least 10 mm at every location.

3. The trimmer according to claim 1, wherein the rear side at the heel of hand support surface of the heel of hand support is approximately planar in a section plane perpendicular to the longitudinal axis of the at least one handle.

4. The trimmer according to claim 1, wherein the heel of hand support is arranged at a half of the handle adjoining the fastening end.

5. The trimmer according to claim 1, wherein the handles each have a different shape.

6. The trimmer according to claim 1, wherein the handles include a right handle and a left handle, viewed in a direction toward the tool unit, wherein the right handle is larger than the left handle.

7. The trimmer according to claim 1, wherein at least one of the handles in at least one section of the shaft is provided with a rubber coating.

8. The trimmer according to claim 1, wherein the at least one handle comprises an operating element, wherein the operating element is configured to pivot about a pivot axis, and wherein the heel of hand support surface of the heel of hand support, viewed in a section extending perpendicularly to the longitudinal axis of the at least one handle, is inclined at an angle in relation to the pivot axis of the operating element, wherein the angle at every point thereof is less than 45°.

9. The trimmer according to claim 8, further comprising a drive motor, wherein the operating element is configured to adjust a rotary speed of the drive motor.

10. The trimmer according to claim 1, wherein:
    a first operating element is pivotably supported about a first pivot axis at the shaft of the at least one handle;
    a second operating element is pivotably supported about a second pivot axis at the shaft of the at least one handle;
    the first operating element is configured to control a drive motor of the trimmer;
    the second operating element is configured to prevent, in a non-actuated position of the second operating element, a control action of the drive motor by the first operating element;
    the second operating element comprises an actuating section projecting from the shaft in the non-actuated position of the second operating element;
    the actuating section comprises a first end and a second end, wherein the first end is positioned closer to the fastening end of the shaft and the second end is positioned closer to the free end of the shaft;

the second pivot axis is positioned closer to the first end of the actuating section than to the second end of the actuating section.

11. A trimmer comprising:

a guide tube;

a tool unit connected to a tool unit end of the guide tube;

a handlebar comprising a bar secured to the guide tube and further comprising handles, wherein each handle is arranged at a respective end of the bar;

wherein the handles each comprise a shaft comprising a fastening end and a free end, the fastening end configured to secure the handle to the end of the bar;

wherein the handles each comprise a front side facing the tool unit end of the guide tube and an oppositely positioned rear side;

wherein the handles each comprise an inner side and an outer side, wherein the inner sides face each other and wherein the outer sides face away from each other;

wherein at least one of the handles comprises a heel of hand support configured as an elevation extending at the inner side and at the rear side of the shaft;

wherein a maximum distance of the heel of hand support in relation to a longitudinal axis of the at least one handle amounts to at least 0.7 times a diameter of the shaft of the at least one handle, wherein the diameter is measured perpendicularly to the maximum distance and perpendicularly to the longitudinal axis of the at least one handle.

12. The trimmer according to claim 11, wherein the rear side at a heel of hand support surface of the heel of hand support in a section plane perpendicular to the longitudinal axis of the at least one handle comprises a radius of at least 10 mm at every location.

13. The trimmer according to claim 11, wherein the rear side at a heel of hand support surface of the heel of hand support is approximately planar in a section plane perpendicular to the longitudinal axis of the at least one handle.

14. The trimmer according to claim 11, wherein the heel of hand support is arranged at a half of the handle adjoining the fastening end.

15. The trimmer according to claim 11, wherein the handles each have a different shape.

16. The trimmer according to claim 11, wherein the handles include a right handle and a left handle, viewed in a direction toward the tool unit, wherein the right handle is larger than the left handle.

17. The trimmer according to claim 11, wherein at least one of the handles in at least one section of the shaft is provided with a rubber coating.

18. The trimmer according to claim 11, wherein:

a first operating element is pivotably supported about a first pivot axis at the shaft of the at least one handle;

a second operating element is pivotably supported about a second pivot axis at the shaft of the at least one handle;

the first operating element is configured to control a drive motor of the trimmer;

the second operating element is configured to prevent, in a non-actuated position of the second operating element, a control action of the drive motor by the first operating element;

the second operating element comprises an actuating section projecting from the shaft in the non-actuated position of the second operating element;

the actuating section comprises a first end and a second end, wherein the first end is positioned closer to the fastening end of the shaft and the second end is positioned closer to the free end of the shaft;

the second pivot axis is positioned closer to the first end of the actuating section than to the second end of the actuating section.

\* \* \* \* \*